United States Patent

Hagiwara et al.

[11] Patent Number: 5,885,654
[45] Date of Patent: Mar. 23, 1999

[54] POLYSILAZANE-BASED COATING SOLUTION FOR INTERLAYER INSULATION

[75] Inventors: Yoshio Hagiwara, Tokyo; Tatsuhiko Shibuya, Kanagawa-ken, both of Japan

[73] Assignee: Tokyo Ohka Kogyo Co., Ltd., Japan

[21] Appl. No.: 909,848

[22] Filed: Aug. 12, 1997

[30] Foreign Application Priority Data

Aug. 14, 1996 [JP] Japan ..................... 8-214763

[51] Int. Cl.$^6$ ..................... B05D 3/02
[52] U.S. Cl. ............. 427/226; 427/377; 427/379; 427/387; 524/366; 524/251
[58] Field of Search .................. 524/366, 251; 427/226, 377, 379, 387

[56] References Cited

U.S. PATENT DOCUMENTS

| 4,756,977 | 7/1988 | Haluska et al. ............. 428/704 |
| 4,840,778 | 6/1989 | Arai et al. ................ 423/324 |
| 5,614,271 | 3/1997 | Shibuya et al. ............ 427/541 |

FOREIGN PATENT DOCUMENTS

| 60-145903 | 8/1985 | Japan . |
| 4-63833 | 2/1992 | Japan . |
| 4-341705 | 11/1992 | Japan . |
| 6-128529 | 5/1994 | Japan . |
| 8-176510 | 7/1996 | Japan . |
| 8-181131 | 7/1996 | Japan . |
| 9-125006 | 5/1997 | Japan . |
| 9-047722 | 2/1999 | Japan . |

*Primary Examiner*—Erma Cameron
*Attorney, Agent, or Firm*—Wenderoth, Lind & Ponack, L.L.P.

[57] ABSTRACT

Proposed is a coating solution for the formation of an interlayer insulating film of silicon dioxide in the manufacture of various kinds of electronic devices having excellent storage stability and coating workability. The principal ingredient of the coating solution, of which the solvent is preferably a dialkyl ether, is a polysilazane compound modified with a trimethylsilylating agent such as hexamethyl disilazane to such an extent that, in the $^1$H-NMR spectrometric diagram, the ratio of the area of the peak assignable to $SiH_3$ to the total area of the peaks assignable to $SiH_1$ and $SiH_2$ is in the range from 0.15 to 0.45. An interlayer insulating film can be formed by coating a substrate with the coating solution, drying the coating layer and baking the dried coating layer at 300° to 800° C. in a moisturized atmosphere. The coating solution optionally contains a trialkyl amine compound as an agent to reduce sublimation of the low molecular weight fractions of the polysilazane compound. The reaction of the trialkyl amine and the polysilazane molecules is completed by keeping the coating layer before drying at a temperature of 25° to 100° C. for at least 1 minute.

18 Claims, No Drawings

POLYSILAZANE-BASED COATING SOLUTION FOR INTERLAYER INSULATION

BACKGROUND OF THE INVENTION

The present invention relates to a polysilazane-based coating solution for the formation of an interlayer insulating layer as well as to a method for the formation of an interlayer insulating layer by using the coating solution. More particularly, the present invention relates to a polysilazane-based coating solution for the formation of an interlayer insulating film which is excellent in respect of the storage stability and coating workability and capable of giving an insulating film having denseness and good surface profile and has little problem in safety due to the use of an organic solvent of low toxicity against human body so as to be useful for the formation of an insulating interlayer film in the manufacture of semiconductor devices, liquid crystal display panels and the like as well as to a method for the formation of an interlayer insulating film by the use of the coating solution.

It is sometimes required in the manufacture of various kinds of electronic devices such as semiconductor devices, liquid crystal display panels and the like to form an interlayer insulating film on the surface of a solid substrate. Various coating solutions have been proposed as suitable for the purpose of forming an interlayer insulating film including those coating solutions containing a polysilazane-based resin having high inorganic nature (see Denshi Zairyo (Electronic Materials), 1994, December issue, pages 50–55 and Japanese Patent Kokai 4-341705, 6-73340, 6-128529 and 6-142600).

As compared with conventional coating solutions for interlayer insulation containing an alkoxysilane as the film-forming ingredient, the above mentioned polysilazane-based coating solutions are advantageous and highlighted in recent years by virtue of the outstandingly low content of organic matters in the film-forming ingredient because, in the formation of an insulating film by the process involving coating of the substrate surface with the solution, drying and baking treatment, the amount of the organic constituents lost from the coating layer by thermal decomposition in the baking treatment is very small so that the denseness of the insulating interlayer film is high so much.

The above mentioned polysilazane-based coating solutions, however, are practically not quite satisfactory due to the defects in respects of their low storage stability and irreproducibility of the quality to give interlayer insulating films having reproducibly high denseness and good surface configuration only with difficulties. In addition, sublimation of the polysilazane may take place in the course of the drying and baking treatment usually undertaken at 100° to 300° C. and the sublimates from the coating layer deposit on the inner walls of the baking oven to cause heavy contamination of the oven. Moreover, sublimation of the polysilazane constituents from the coating layer necessarily leads to shrinkage of and crack formation in the coating film. It is presumable that the above mentioned sublimation of the polysilazane constituents is caused by the low molecular weight fractions of polysilazane contained in the polysilazane-based coating solution.

Further, while the organic solvent used for the preparation of the polysilazane-based coating solutions is mostly xylene in view of the relatively high storage stability of the coating solution prepared therewith, xylene is not without safety problems against human health so that it is eagerly desired to replace xylene with another organic solvent of low toxicity but still capable of giving a polysilazane-based coating solution exhibiting good storage stability and coating workability of the coating solution.

SUMMARY OF THE INVENTION

The present invention accordingly has an object to provide a novel polysilazane-based coating solution for the formation of an interlayer insulating film without little safety problems against human body but having excellent storage stability and coating workability and capable of reproducibly forming an insulating film with denseness and having excellent surface configuration and high electric insulation with a volume resistivity of $10^{10}$ to $10^{17}$ ohm·cm required for interlayer insulation and good step coverage without cracks even on a substrate surface having a stepped level difference. The invention also has an object to provide a method for the formation of an interlayer insulating film by using the above mentioned polysilazane-based coating solution.

Thus, the coating solution provided by the invention is a solution of a polysilazane in an inert organic solvent, of which the polysilazane ingredient is modified with a suitable silylating agent in such a way that, in a $^1$H-NMR spectrometric diagram thereof, the ratio of the area of the peak for $SiH_3$ to the total area of the peaks for $SiH_1$ and $SiH_2$ is in the range from 0.15 to 0.45.

In particular, modification of the polysilazane ingredient is effected in such a way that, in a $^1$H-NMR spectrum thereof, the ratio of the area of the peak for $SiCH_3$ to the total area of the peaks for $SiH_1$ and $SiH_2$ is in the range from 0.30 to 0.55.

Preferably, the above mentioned modification of the polysilazane ingredient is effected by using hexamethyl disilazane as the modification agent and the inert organic solvent is a dialkyl ether of which the alkyl groups each have at least 4 carbon atoms.

The method of the invention for the formation of an interlayer insulating film on the surface of a substrate by using the above defined coating solution comprises the steps of:

(a) coating the substrate surface with the coating solution to form a coating layer;

(b) drying the coating layer; and (c) baking the dried coating layer at a temperature in the range from 300° to 800° C. in a moisturized atmosphere.

DETAILED DESCRIPTION OF THE PREFERRED EMBODIMENTS

The polysilazane compound, which is the base material of the modified polysilazane resin as the principal ingredient in the inventive coating solution, per se is a known compound and those polysilazane resins disclosed in the patent documents given before can be used in the invention as the base material for the modification reaction without particular limitations although it is preferable that the polysilazane compound has a molecular weight distribution as narrow as possible for the reasons described below.

It is desirable for an interlayer insulating coating solution used in the manufacturing process of semiconductor devices with extremely fine patterning that the interlayer insulating films formed on a great number of substrates always have a very uniform and reproducible thickness of several tens of nanometers. Extreme difficulties are encountered, however, in controlling the thickness of the coating films to ensure high uniformity which is influenced by any very small differences in the coating conditions. For example, properties of the coating solution per se are subject to non-negligible changes by storage over months so that a coating solution immediately after preparation and a coating solution after several months of storage give coating films having a substantial difference in the thickness even when the coating conditions are identical. According to the results of investigations to obtain a polysilazane-based coating solution having excellent storage stability, this problem can be mitigated by using a polysilazane resin having a narrow molecular weight distribution.

Since a polysilazane compound has active hydrogen atoms directly bonded to the nitrogen atoms and silicon atoms, it is generally understood that the crosslinking reaction of these active hydrogen atoms is responsible for the viscosity increase and eventual gelation of the solution containing the polysilazane compound during storage. This problem or disadvantage is more serious when the polysilazane compound has a larger molecular weight so that the polysilazane compound as the principal ingredient of the coating solution should have an average molecular weight not so high in order to ensure uniformity of the coating film formed from the coating solution by a single coating work and to facilitate concentration control of the solution. When the polysilazane-based coating solution contains a large amount of polysilazane fractions of low molecular weight molecules, on the other hand, various troubles are caused that the coating film has low crosslinkability sometimes suffering appearance of orange peel of the coating surface in addition to the problem that the amount of sublimation in the course of drying and baking is increased from the coating layer which causes undue shrinkage resulting in a decrease in the film thickness and eventual crack formation. The above described situations lead to a conclusion that the polysilazane compound as the principal resinous ingredient of the coating solution should have a well controlled molecular weight distribution.

In this regard, it has been discovered that the polysilazane compound as the resinous ingredient of the inventive coating solution should preferably have a weight average molecular weight in the range from 1500 to 5000 or, preferably, from 1700 to 3000 as determined by the gel permeation chromatographic method making reference to polystyrene resins having known molecular weights with a dispersion of the molecular weight distribution expressed by the ratio of the weight average molecular weight Mw to the number average molecular weight Mn, i.e. Mw:Mn, not exceeding 4.

A quite unexpected discovery leading to the present invention is that a specific $^1$H-NMR spectrometric parameter of the polysilazane compound is a very important factor for the control of the properties and behavior of the polysilazane-based coating solution relative to the storage stability and coating workability of the coating solution reproducibly to give interlayer coating films with denseness and good surface configuration. The indicative parameter in the above mentioned meaning is, in a $^1$H-NMR spectrometric diagram of the polysilazane compound, the ratio of the area of the peak for $SiH_3$ to the total area of the peaks for $SiH_1$ and $SiH_2$ which should be in the range from 0.15 to 0.45.

The above mentioned desirable NMR spectrometric parameter can be accomplished by conducting preparation of the modified polysilazane compound from an appropriately selected amount of the starting material under appropriate reaction conditions but it is a convenient and advantageous method that a polysilazane compound prepared by a conventional method is reacted with hexamethyl disilazane so as to substitute trimethylsilyl groups for a part of the active hydrogen atoms in the polysilazane compound.

The modification reaction of a polysilazane with hexamethyl disilazane is conducted until the above mentioned NMR spectrometric parameter of 0.15 to 0.45 is obtained. When the parameter is smaller than 0.15, the polysilazane-based coating solution has poor coating workability not to give a dense coating film having good surface configuration sometimes with occurrence of pinholes and orange peel of the surface. When the parameter is too large, on the other hand, the coating solution has decreased storage stability to cause difficulties in reproducibly obtaining excellent coating films. It is more preferable that the value of the NMR spectrometric parameter mentioned above is in the range from 0.22 to 0.32.

The modification reaction of a polysilazane compound with hexamethyl disilazane is conducted preferably to such an extent that another $^1$H-NMR spectrometric parameter, which is, in a $^1$H-NMR spectrum, the ratio of the area of the peak for $SiCH_3$ to the total area of the peaks for $SiH_1$ and $SiH_2$, is in the range from 0.30 to 0.55 or, preferably, from 0.30 to 0.50. The storage stability of the polysilazane-based coating solution cannot be further improved even by conducting the modification reaction to have the value of this second NMR parameter exceeding 0.55 only with an economical disadvantage while, when the value of the second NMR parameter is too small, full improvement in the storage stability of the coating solution cannot be accomplished.

Although, in the above description, the modification reaction of polysilazane is assumed to be conducted with hexamethyl disilazane as a silylating agent, it is of course optional that the reaction is conducted with any of other trimethylsilylating agent known in the arts.

In the $^1$H-NMR spectrometric diagram of a polysilazane compound, as is known, the peaks having a δ value of 4.5 to 5.3 ppm are assignable to $SiH_1$ and $SiH_2$, the peak having a δ value of 0.0 to 0.2 ppm is assignable to $SiCH_3$ and the peak having a δ value of 4.3 to 4.5 ppm is assignable to $SiH_3$ so that the above mentioned ratios of the peak areas can be obtained from the ratios of proton in the respective integration curves.

The polysilazane compound as the principal ingredient in the inventive coating solution can be prepared by any known methods including a method by conducting a polymerization reaction with introduction of ammonia and a method in which the polymerization reaction is conducted at an elevated temperature under a superatmospheric pressure, of which the latter method is preferred in respect of higher storage stability of the polysilazane compound obtained thereby.

The polysilazane-based coating solution of the invention is a uniform solution of the modified polysilazane compound in an organic solvent which is selected from those solvents having low moisture absorption and boiling point in the range from 50° to 200° C. as well as low toxicity against human body in consideration of the requirements relative to the storage stability of the coating solution and the balance between the risk of fire accident and drying velocity of the solution. Examples of suitable organic solvents include dialkyl ether solvents of which each of the two alkyl groups in a molecule has at least 4 carbon atoms as well as cyclohexene, dimethyl cyclohexane, ethyl cyclohexane, p-menthane, decahydronaphthalene, 2,2,5-trimethyl hexane, dipentene, decane, isononane, octane and the like, of which dialkyl ethers are preferable and dibutyl ether is more preferable. The use organic solvents can be used either singly or as a mixture of two kinds or more according to need.

It is optional or desirable that the polysilazane-based coating solution of the invention is admixed with an additive having activity to suppress sublimation of the polysilazane compound in order to reduce sublimation of low molecular weight fractions of the polysilazane compound from the coating layer in the course of the drying and baking thereof. Namely, the sublimation-reducing agent here used has reactivity with low molecular weight fractions of the polysilazane to increase the molecular weight thereof so that sublimation of the low molecular weight molecules can be suppressed. Examples of preferable sublimation-reducing agents include trialkyl amine compounds. It is a requirement for a sublimation-reducing agent that, even if the compound remains unreacted in the coating layer, the remaining compound can be completely removed by evaporation in the drying process together with the solvent of the coating solution so that the sublimation-reducing agent used in the inventive coating solution should have a boiling point in the range from 200° to 300° C. Trialkyl amine compounds satisfying this boiling point requirement include tributylamine, tripentylamine, trihexylamine, triheptylamine, trioctylamine, monobutyl dipentyl amine, monohexyl dipentyl amine and the like, of which tripentylamine is preferable in respects of the good reactivity thereof with the low molecular weight molecules of polysilazane compound and high storage stability of the coating solution formulated therewith. Among the several isomers of tripentylamine compound, tri-n-pentylamine is particularly preferred. These trialkylamine compounds can be used as the sublimation-reducing agent either singly or as a combination of two kinds or more according to need.

The amount of the sublimation-reducing agent added to the coating solution, when added, is in the range from 1 to 10% by weight or, preferably, from 3 to 5% by weight based on the content of non-volatile matters in the solution. When the amount is too small, the desired sublimation-reducing effect cannot be obtained while, when too large, a decrease is caused in the storage stability of the solution along with a problem in the peelability of the coating film as a consequence of the increase in the molecular weight.

The sublimation-reducing agent generally plays a role in the direction reverse to that of hexamethyl disilazane. Namely, the molecular weight of the polysilazane compound is increased by the addition of a sublimation-reducing agent. Accordingly, the amount of the sublimation-reducing agent added to the coating solution should be selected in consideration of the amount of hexamethyl disilazane added to the solution. As a rough measure, the amount of the sublimation-reducing agent is in the range from 0.7 to 1.5% by weight based on the amount of hexamethyl disilazane pertaining to the reaction.

Though not particularly limitative, the content of non-volatile matters in the inventive polysilazane-based coating solution should be in the range from 10 to 40% by weight or, preferably, from 15 to 25% by weight. When the solid content is too high, the coating solution would suffer a decrease in the storage stability so as to cause a difficulty in the control of the thickness of the coating films while, when the solid content is too low, the film thickness obtained by a single coating work is so small that several times repetition of coating works is required in order to obtain a desired thickness of the coating films.

In the next place, description is given of the method for the formation of an interlayer insulating coating film by using the above described polysilazane-based coating solution.

In the first place, a substrate is coated with the polysilazane-based coating solution at room temperature or at a temperature of 20° to 25° C. by a suitable known coating method such as the spin-coating method, spray coating method, dipping method and the like followed by heating at a temperature of 100° to 300° C. to remove the solvent by evaporation giving a dried coating film. It is preferable in order to efficiently suppress sublimation of the low molecular weight fractions of the polysilazane with the sublimation-reducing agent that the above mentioned drying treatment of the coating layer is preceded by a holding period for at least 1 minute at a temperature of 25° to 100° C. or, preferably, for at least 3 minutes at 40° to 70° C. The low molecular weight molecules of the polysilazane compound are reacted during this holding period with the sublimation-reducing agent. When the temperature at this holding period is too high, no complete suppression of sublimation can be accomplished so that fuming from the coating layer may eventually be caused in the course of the drying treatment at 100° to 300° C. due to sublimation of the polysilazane molecules. The reason for this trouble is, though not well understood, presumably that the reaction between the polysilazane compound and the sublimation-reducing agent is promoted locally at an elevated temperature resulting in unevenness of the reacted sites to leave a substantial amount of low molecular weight molecules of the polysilazane compound.

The above described presumption leads to a conclusion that the temperature during the holding period should preferably be relatively low so as to evenly and moderately promote the reaction between the polysilazane compound and the sublimation-reducing agent. It is of course optional to conduct the holding treatment under stepwise increase of the temperature, for example, firstly at 50° C. for 1 minute, then at 60° C. for 1 minute and finally at 90° C. for 1 minute.

The length of time for the holding treatment should be at least 1 minute. When the time is too short, the reaction of the sublimation-reducing agent with the polysilazane is incomplete so that the trouble due to sublimation of the polysilazane is sometimes caused in the subsequent drying procedure to deposit silicon dioxide dust on the inner walls of the drying room which eventually falls onto the coating film resulting in quality degradation of the coating films along with undue shrinkage of the coating film by the sublimation of the polysilazane to decrease the film thickness.

The humidity condition of the atmosphere in which the holding treatment is undertaken may have certain influences on the effectiveness of the holding treatment so that the relative humidity of the holding atmosphere should preferably be 45 to 55%, though not particularly limitative. When the relative humidity of the atmosphere is too high, the coating layer absorbs moisture from the atmosphere although the efficiency of the sublimation-reducing agent can be somewhat enhanced under a higher relative humidity than 55%.

While the coating work of substrates with the coating solution and the holding treatment of the coated substrates can be undertaken in one and the same room as a principle, it is efficient to conduct the holding treatment by the transfer of the coated substrates to a separate holding room on a hot plate kept at the specified holding temperature in order to avoid the inefficiency due to interruption of the coating works during the holding treatment or to quickly adapt the changes in the temperature setting.

The coating film of the polysilazane-based coating solution on the substrate surface after completion of drying is then subjected to a baking treatment at a temperature in the range from 300° to 800° C. for 15 to 60 minutes in an atmosphere moisturized or humidified by continuously or intermittently introducing a gas having a relative humidity of 45% or higher at 100° C. or a moisturized carrier gas containing from 0.001 to 0.1 g of water vapor per liter into the baking room so as to convert the polysilazane of the coating film into silicon dioxide by oxidation. The oxidation of polysilazane into silicon dioxide need not be complete but can be partial by appropriately selecting the baking conditions such as the length of baking time, baking temperature, humidity of the baking atmosphere and the like.

The interlayer insulating coating film having a thickness of 0.1 to 1.2 μm obtained in the above described manner is formed substantially from silicon dioxide and has excellent film properties without cracks and pinholes even on a substrate surface having ruggedness or stepped level differences with good reproducibility. Accordingly, the polysilazane-based coating solution of the present invention is useful for the formation of an interlayer insulating film in the manufacture of electronic devices and parts such as semiconductor devices and liquid crystal display panels along with the advantage in respect of little safety problem against human body by virtue of the use of specific organic solvents having little toxicity.

In the following, the present invention is illustrated in more detail by way of Examples, which, however, never limit the scope of the invention in any way.

EXAMPLE 1

A polysilazane-based coating solution, referred to as the coating solution A hereinafter, was prepared in the following manner. Thus, the modification reaction of a polysilazane compound prepared from dichlorosilane and ammonia as the starting materials according to a conventional procedure was conducted with hexamethyl disilazane to such an extent that the $^1$H-NMR spectrometric parameters relative to the peak area ratio of $(SiH_1+SiH_2):SiCH_3:SiH_3$ of 1:0.45:0.40 was obtained. The coating solution was a 20% by weight dibutyl ether solution of the polysilazane compound having a weight average molecular weight of 2200 and a number average molecular weight of 950 and the amount of the solution as prepared was 100 g.

The above prepared coating solution A was applied on a spinner rotating at 2000 rpm for 20 seconds at a temperature of 23° C. in an atmosphere of 45% relative humidity onto the surface of a semiconductor silicon wafer provided with a line-and-space circuit pattern of aluminum with a line and space widths of 1.2 Mm and 0.7 to 10.0 μm, respectively, forming a stepped level difference of 1 μm height. The coating workability of the coating solution A was excellent without any problems. Thereafter, the marginal portion of the thus formed coating layer was removed under rotation at 1500 rpm by washing with dibutyl ether ejected for 5 seconds at a rate of 50 ml/minute out of the wafer-edge cleaning nozzle mounted on the coating machine to find good removability of the coating layer.

In the next place, the coating layer thus formed on the substrate surface was subjected to a drying treatment at 250° C. for 3 minutes and then to a baking treatment in a baking room at a temperature of 450° C. for 30 minutes in a moisturized atmosphere by introducing oxygen gas containing 0.01 g/liter of water vapor to give a highly insulating film of silicon dioxide which was found to be very uniform and smooth having no detectable cracks on the surface. As a measure of the thickness of the thus formed insulating coating film, the same procedure as above was undertaken excepting for the replacement of the substrate wafer with a plain silicon wafer and a decrease of the coating time on the spinner from 20 seconds to 10 seconds to find that the thickness of the thus formed reference coating film was 0.36 μm as determined by using an ellipsometer.

EXAMPLES 2 AND 3

Polysilazane-based coating solutions, referred to as the coating solutions B and C hereinafter, were prepared each in substantially the same manner as in the preparation of the coating solution A except that the amount of hexamethyl disilazane addition was changed such that the $^1$H-NMR spectrometric parameters relative to the peak areas $(SiH_1+SiH_2):SiCH_3:SiH_3$ were adjusted to 1:0.30:0.40 and 1:0.50:0.40, respectively.

The evaluation tests of these coating solutions B and C were undertaken in the same manner as in Example 1 to find that the results were quite satisfactory as in Example 1 in all respects.

EXAMPLES 4 AND 5

Polysilazane-based coating solutions, referred to as the coating solutions D and E hereinafter, were prepared each in substantially the same manner as in the preparation of the coating solution A except that the amount of hexamethyl disilazane addition was changed such that the $^1$H-NMR spectrometric parameters relative to the peak areas $(SiH_1+SiH_2):SiCH_3:SiH_3$ were adjusted to 1:0.45:0.30 and 1:0.45:0.45, respectively.

The evaluation tests of these coating solutions D and E were undertaken in the same manner as in Example 1 to find that the results were quite satisfactory as in Example 1 in all respects, although the coating workability of the coating solution D was somewhat poor to cause occurrence of slight striation on the surface of the coating layer.

EXAMPLES 6, 7 AND 8

Polysilazane-based coating solutions, referred to as the coating solutions F, G and H hereinafter, were prepared each in substantially the same manner as in the preparation of the coating solution A excepting for the replacement of dibutyl ether as the solvent with octane, isononane and decane, respectively.

The evaluation tests of these coating solutions F, G and H were undertaken in the same manner as in Example 1 to find that the results were quite satisfactory as in Example 1 in all respects, although the coating workability of each of the coating solutions was somewhat poor to cause occurrence of slight striation on the surface of the coating layer.

EXAMPLE 9

A polysilazane-based coating solution, referred to as the coating solution I hereinafter, was prepared in substantially the same manner as in the preparation of the coating solution A except that the amount of hexamethyl disilazane addition was changed such that the $^1$H-NMR spectrometric parameters relative to the peak areas $(SiH_1+SiH_2):SiCH_3:SiH_3$ were adjusted to 1:0.45:0.27 and that 1.0 g of tri-n-pentyl amine was added to the solution.

The above prepared coating solution I was applied on a spinner rotating at 2000 rpm for 10 seconds at a temperature of 23° C. in an atmosphere of 45% relative humidity onto the surface of a semiconductor silicon wafer provided with a line-and-space circuit pattern of aluminum with a line and space widths of 1.2 μm and 0.7 to 10.0 μm, respectively, forming stepped level difference of 1 μm. The coating workability of the coating solution I was excellent without any problems. Thereafter, the marginal portion of the thus formed coating layer was removed under rotation at 1500 rpm by washing with dibutyl ether ejected for 5 seconds at a rate of 50 ml/minute out of the wafer-edge cleaning nozzle mounted on the coating machine to find good removability of the coating layer.

In the next place, the coating layer thus formed on the substrate surface was subjected, after a holding time of 3 minutes at 50° C., to a drying treatment at 250° C. for 3 minutes without the phenomenon of fuming due to sublimation of the polysilazane and then to a baking treatment in a baking room at a temperature of 450° C. for 30 minutes in a moisturized atmosphere by introducing oxygen gas containing 0.01 g/liter of water vapor to give a highly insulating film of silicon dioxide which was found to be very uniform and smooth having no detectable cracks on the surface. As a measure of the thickness of the thus formed insulating coating film, the same procedure as above was undertaken excepting for the replacement of the substrate wafer with a plain silicon wafer to find that the thickness of the thus formed reference coating film was 0.36 μm as determined by using an ellipsometer.

EXAMPLES 10 AND 11

Polysilazane-based coating solutions, referred to as the coating solutions J and K hereinafter, were prepared each in substantially the same manner as in the preparation of the coating solution I excepting for the replacement of tri-n-pentyl amine with the same amount of tri-n-butyl amine and tri-n-hexyl amine, respectively.

The evaluation tests of these coating solutions J and K were undertaken in the same manner as in Example 9 to find that the results were quite satisfactory as in Example 9 in all respects.

EXAMPLE 12

A polysilazane-based coating solution, referred to as the coating solution L hereinafter, was prepared in substantially the same manner as in the preparation of the coating solution I excepting for an increase of the amount of tri-n-pentyl amine to 2.5 g.

The evaluation tests of the coating solution L were undertaken in the same manner as in Example 9 to find that the results were quite satisfactory as in Example 9 in all respects except that the coating film formed from the coating solution L was somewhat poor in the removability in the marginal areas.

EXAMPLES 13, 14, 15 AND 16

The same polysilazane-based coating solution I as prepared in Example 9 was subjected to the evaluation tests under the same conditions as in Example 9 except that the temperature of the holding treatment was changed to 20° C., 30° C., 70° C. and 90° C., respectively.

The results of the evaluation tests were quite satisfactory in all respects as in Example 9 although slight fuming was noted in Example 16 in the drying treatment of the coating layer.

EXAMPLE 17

The same experimental procedure as in Example 9 was repeated except that the temperature of the holding treatment was increased to 120° C. The results of the evaluation tests were generally satisfactory as in Example 9 although a small amount of fuming was found in the drying treatment to cause deposition of a trace amount of silicon dioxide on the inner walls of the drying room.

EXAMPLES 18, 19 AND 20

The same experimental procedure as in Example 9 was repeated excepting for the change of the length of time for the holding treatment to 2 minutes, 7 minutes and 10 minutes, respectively. The results of the evaluation tests in each of the Examples were quite satisfactory as in Example 9 although slight fuming was noted in Example 18.

EXAMPLE 21

The same experimental procedure as in Example 9 was repeated except that the length of time for the holding treatment was decreased to 1 minute. The results of the evaluation tests were generally satisfactory as in Example 9 although a small amount of fuming was found in the drying treatment to cause deposition of a trace amount of silicon dioxide on the inner walls of the drying room.

EXAMPLE 22

The experimental procedure was substantially the same as in Example 9 excepting for the replacement of the oxygen gas of 90% relative humidity introduced into the baking room with oxygen gas containing 0.02 g/liter of water vapor. The results of the evaluation tests of the coating film were quite satisfactory in the surface configuration and electric insulation.

Comparative Example 1

A comparative coating solution, referred to as the coating solution X hereinafter, was prepared in substantially the same manner as in the preparation of the coating solution A in Example 1 except that the modification reaction of the polysilazane by the addition of hexamethyl disilazane was conducted to such an extent that the $^1$H-NMR spectrometric parameters relative to the ratios of the peak areas (SiH$_1$+SiH$_2$):SiCH$_3$:SiH$_3$ were adjusted to 1:0:0.10.

The results of the evaluation tests of the coating solution X undertaken in the same manner as in Example 1 were that the surface of the coating layer was defective due to occurrence of striation and orange peel. Inspection of the coating layer after the drying treatment by the FT-IR method indicated that conversion of the polysilazane to silicon dioxide had already proceeded to a substantial extent so that the storage stability of the coating solution was not high enough.

Comparative Example 2

Another comparative coating solution, referred to as the coating solution Y hereinafter, was prepared in substantially the same manner as in the preparation of the coating solution A in Example 1 except that the modification reaction of the polysilazane by the addition of hexamethyl disilazane was conducted to such an extent that the $^1$H-NMR spectrometric parameters relative to the ratios of the peak areas (SiH$_1$+SiH$_2$):SiCH$_3$:SiH$_3$ were adjusted to 1:0.45:0.10.

The results of the evaluation tests of the coating solution Y undertaken in the same manner as in Example 1 were that the surface of the coating layer was defective due to occurrence of striation and orange peel.

Reference Example

Each of the coating solutions A through L, X and Y prepared in Examples 1 to 12 and Comparative Examples 1 and 2 was hermetically sealed in a glass bottle in the atmospheric air and stored for 6 months at 40° C. The results of this storage tests were that a slight increase of the viscosity was found for the coating solutions B and L with an increase of the weight average molecular weight by about 100 to 200 while the coating solution X indicated a remarkable increase of the viscosity with an increase of the weight average molecular weight by 1500.

EXAMPLE 23

The insulating coating film on the substrate surface formed in each of Examples 1 to 22 was overlaid with an overcoating layer of silicon dioxide formed by the plasma CVD method using tetraethoxysilane as the base material in a thickness of 500 nm.

The thus formed overcoating layers were found to have good quality with a very smooth and flat surface excepting for the substrates having an interlayer insulating film prepared in Examples 1 to 8 of which slight surface roughening was detected.

Comparative Example 3

An overcoating layer was formed in the same manner as in Example 23 described above on the surface of the interlayer insulating coating film on the substrate prepared in each of Comparative Examples 1 and 2.

The surface condition of the overcoating layers was poor with remarkable ruggedness due to occurrence of a large number of projections and pits presumably due to the particles found on the surface of the interlayer insulating films.

What is claimed is:

1. A polysilazane-based coating solution for the formation of an interlayer insulating coating film which comprises, as a uniform solution:
   (a) an inert organic solvent having a boiling point in the range from 50° to 200° C.; and
   (b) a polysilazane modified by the reaction with a trimethylsilylating agent to such an extent that, in a $^1$H-NMR spectrometric diagram of the modified polysilazane, the ratio of the area of the peak assignable to $SiH_3$ to the total area of the peaks assignable to $SiH_1$ and $SiH_2$ is in the range from 0.15 to 0.45.

2. The polysilazane-based coating solution as claimed in claim 1 in which, in the $^1$H-NMR spectrometric diagram of the modified polysilazane, the ratio of the area of the peak assignable to $SiCH_3$ to the total area of the peaks assignable to $SiH_1$ and $SiH_2$ is in the range from 0.30 to 0.55.

3. The polysilazane-based coating solution as claimed in claim 1 in which the trimethylsilylating agent is hexamethyl disilazane.

4. The polysilazane-based coating solution as claimed in claim 1 in which the inert organic solvent is a dialkyl ether of which each of the alkyl groups has at least 4 carbon atoms.

5. The polysilazane-based coating solution as claimed in claim 1 which further comprises:
   (c) a trialkyl amine compound having a boiling point in the range from 200° to 300° C.

6. The polysilazane-based coating solution as claimed in claim 5 in which the trialkyl amine compound is tri-n-pentyl amine.

7. The polysilazane-based coating solution as claimed in claim 5 in which the amount of the trialkyl amine compound is in the range from 1 to 10% by weight based on the amount of non-volatiles contained in the solution.

8. The polysilazane-based coating solution as claimed in claim 1 in which, in the $^1$H-NMR spectrometric diagram of the modified polysilazane, the ratio of the area of the peak assignable to $SiH_3$ to the total area of the peaks assignable to $SiH_1$ and $SiH_2$ is in the range from 0.22 to 0.32.

9. The polysilazane-based coating solution as claimed in claim 1 in which the modified polysilazane as (b) has a weight-average molecular weight in the range from 1500 to 5000.

10. The polysilazane-based coating solution as claimed in claim 9 in which the modified polysilazane as (b) has a weight-average molecular weight in the range from 1700 to 3000.

11. The polysilazane-based coating solution as claimed in claim 9 in which the modified polysilazane as (b) has such a molecular weight distribution that the ratio of the weight-average molecular weight to the number-average molecular weight does not exceed 4.

12. The polysilazane-based coating solution as claimed in claim 1 in which the content of non-volatiles in the coating solution is in the range from 10 to 40% by weight.

13. A method for the formation of a silicon dioxide-based interlayer insulating coating film on the surface of a substrate which comprises the steps of:
   (A) coating the surface of the substrate with a polysilazane-based coating solution comprising, as a uniform solution:
      (a) an inert organic solvent having a boiling point in the range from 50° to 200° C.; and
      (b) a polysilazane modified by the reaction with a trimethylsilylating agent to such an extent that, in a $^1$H-NMR spectrometric diagram of the modified polysilazane, the ratio of the area of the peak assignable to $SiH_3$ to the total area of the peaks assignable to $SiH_1$ and $SiH_2$ is in the range from 0.15 to 0.45, to form a modified polysilazane-based coating layer;
   (B) subjecting the coating layer to a drying treatment; and
   (C) subjecting the dried coating layer to a baking treatment at a temperature in the range from 300° to 800° C. for at least 15 minutes in a moisturized atmosphere to convert the modified polysilazane into silicon dioxide.

14. The method for the formation of a silicon dioxide-based interlayer insulating coating film on the surface of a substrate as claimed in claim 13 in which the moisturized atmosphere is formed by introducing a gas containing from 0.001 to 0.1 g of water vapor per liter.

15. The method for the formation of a silicon dioxide-based interlayer insulating coating film on the surface of a substrate as claimed in claim 13 in which the temperature of the drying treatment is in the range from 100° to 300° C.

16. A method for the formation of a silicon dioxide-based interlayer insulating coating film on the surface of a substrate which comprises the steps of:
   (A) coating the surface of the substrate with a polysilazane-based coating solution comprising, as a uniform solution:
      (a) an inert organic solvent having a boiling point in the range from 50° to 200° C.;
      (b) a polysilazane modified by the reaction with a trimethylsilylating agent to such an extent that, in a $^1$H-NMR spectrometric diagram of the modified polysilazane, the ratio of the area of the peak assignable to $SiH_3$ to the total area of the peaks assignable to $SiH_1$ and $SiH_2$ is in the range from 0.15 to 0.45, and
      (c) a trialkyl amine compound, to form a modified polysilazane-based coating layer;

(A1) keeping the polysilazane-based coating layer at a temperature in the range from 25° to 100° C. for at least 1 minute;

(B) subjecting the coating layer to a drying treatment at a temperature in the range from 100° to 300° C.; and (C) subjecting the dried coating layer to a baking treatment for at least 15 minutes at a temperature in the range from 300° to 800° C. in a moisturized atmosphere to convert the modified polysilazane into silicon dioxide.

17. The method for the formation of a silicon dioxide-based interlayer insulating coating film on the surface of a substrate as claimed in claim 16 in which the moisturized atmosphere is formed by introducing a gas having a relative humidity of at least 45% at room temperature.

18. The method for the formation of a silicon dioxide-based interlayer insulating coating film on the surface of a substrate as claimed in claim 16 in which the moisturized atmosphere is formed by introducing a gas containing from 0.001 to 0.1 g of water vapor per liter.

* * * * *